June 5, 1934.  J. C. CHENETTE  1,961,843
UNIVERSAL NIBBLER
Filed Jan. 30, 1933
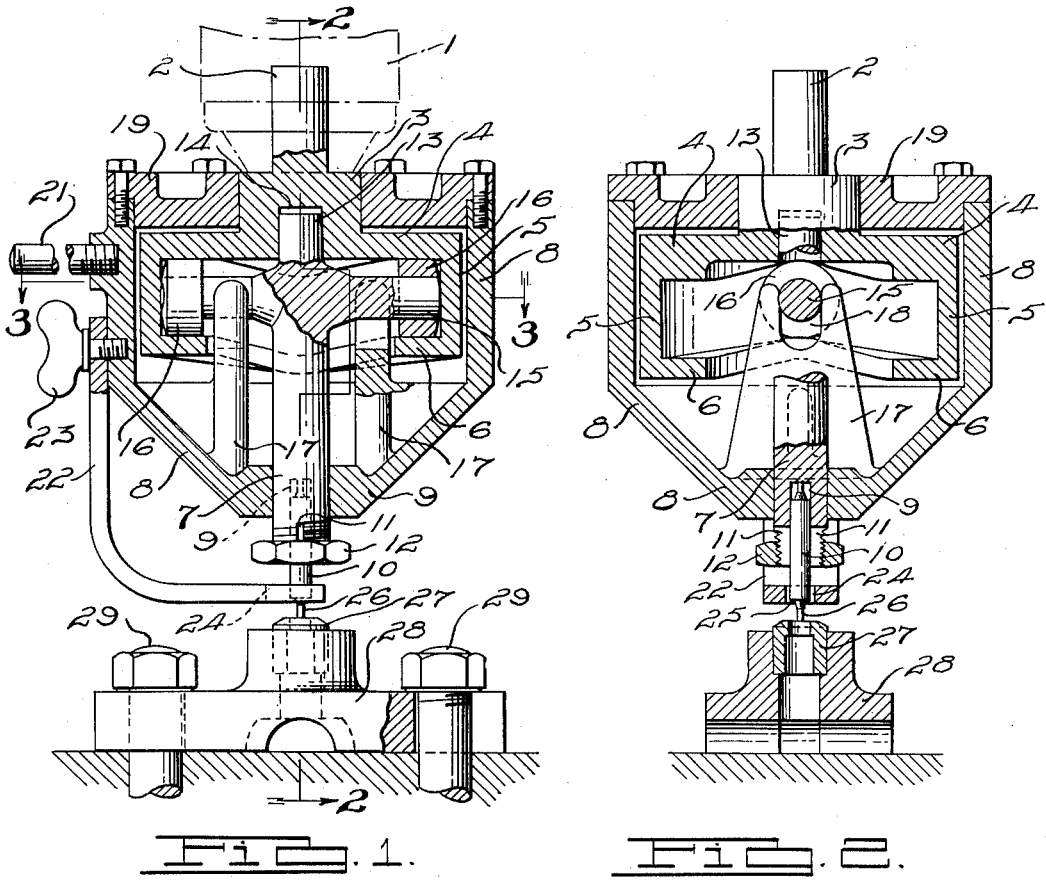
Fig. 1.  Fig. 2.
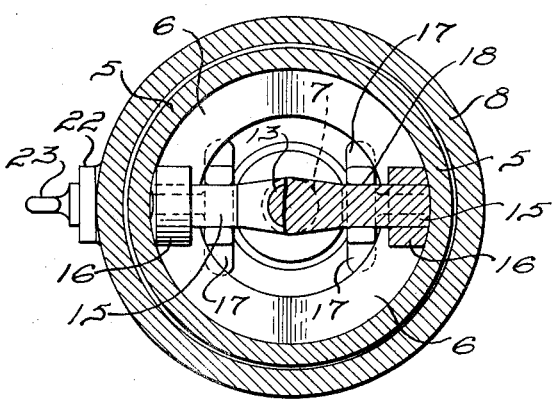
Fig. 3.
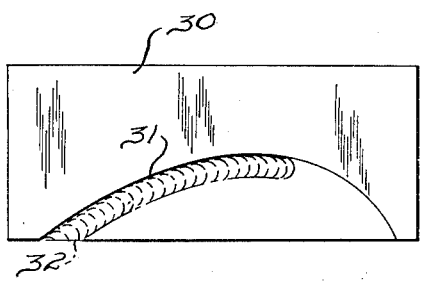
Fig. 4.
INVENTOR.
Joseph C. Chenette.
BY 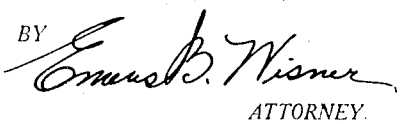
ATTORNEY.

Patented June 5, 1934

1,961,843

UNITED STATES PATENT OFFICE 1,961,843

UNIVERSAL NIBBLER

Joseph C. Chenette, Detroit, Mich.

Application January 30, 1933, Serial No. 654,167

2 Claims. (Cl. 164—47)

This invention relates to universal nibblers and the object of the invention is to provide a machine for nibbling sheet metal and adapted for use in connection with a drill chuck or other rotating spindle or chuck.

In nibbling a tool is reciprocated and a metal sheet is fed into the tool which will nibble the sheet away according to the manner in which it is fed into the nibbling tool and provides a means for cutting a sheet to any unusual contour or form.

One object of my invention is to provide a nibbler which may be universally used and in which the reciprocating action of the tool is produced from rotating action of a drill chuck or spindle.

Another object of the invention is to provide a universal nibbler in which a track cam is provided which is rotated and the tool holder is held stationary and is reciprocated by the rotating track cam.

A further object of the invention is to provide a universal nibbler of the character described in which the tool holder is provided with rollers riding in the track cam and the tool holder is arranged to allow removal or replacement of the nibbling tool.

Another object of the invention is to provide a stationary housing in which the rotating track cam is rotatably mounted, the housing being provided with means for holding the tool holder and tool stationary with the housing so that there are no exposed rotating parts.

These objects and the several novel features of the invention are hereinafter more fully described and claimed and the preferred form of construction by which these objects are attained is shown in the accompanying drawing in which—

Fig. 1 is a section through a universal nibbler embodying my invention.

Fig. 2 is a section taken on line 2—2 of Fig. 1.

Fig. 3 is a section taken on line 3—3 of Fig. 1.

Fig. 4 illustrates the manner in which a metal sheet may be nibbled away with my device.

The device is adapted for use with any rotating chuck, one form of which is indicated in dotted lines 1 in Fig. 1. A spindle 2 is provided which may be secured in the rotating chuck 1 and the spindle 2 is provided with an enlarged portion 3 having a circular portion 4 provided with a depending annular flange 5. Extending inwardly from the lower edge of the annular flange 5 is an annular track flange 6 and the portion 4 and track flange 6 are so shaped, as shown in Figs. 1 and 2, as to provide a track cam, as shown, the portions 4 and 6 being equally spaced throughout the contour of the cam. A tool holder 7 is provided which is slidably mounted in the lower end of the housing 8 and this tool holder is provided with a recess 9 into which the nibbling tool 10 may be positioned. The tool holder is slotted at 11 adjacent the lower end, as shown in Figs. 1 and 2, and a nut 12 is threaded onto this slotted end to bindingly secure the tool 10 in the tool holder. At the upper end, the tool holder is provided with an extending stud 13 which is slidably mounted in a recess 14 provided in the enlarged portion 3 of the spindle 2 and the tool holder is also provided with a cross arm 15 on the extreme ends of which a roller 16 is rotatably mounted. The rollers 16 fit between the flanges 6 and 4 of the track cam and the tool holder is held in stationary position by means of a pair of integral brackets 17 formed in the housing 8.

These brackets 17, as shown in Figs. 1 and 2, are provided with slots 18 in the upper end and the cross arm 15 fits in these slots, as shown. This holds the tool holder in fixed relation with the housing 8 and the housing 8 is provided with a cover plate 19 which is secured thereto and is provided with a boss 20 at the center for the spindle 2. A stop arm 21 is threaded into one side of the housing 8, as shown in Fig. 1 and extends outwardly therefrom and is about fourteen inches in length. This stop arm is adapted to engage against any stationary member, such as a bracket on a drill press, to prevent the housing from rotating with the track cam. A bracket 22 is secured to the side of the housing 8 by the wing nut 23 and the end of this bracket extends downwardly and is provided with a slot 24 in the end through which the nibbling tool 10 extends, as shown in Figs. 1 and 2. This nibbling tool 10 is provided with a cutting edge 25 and with an extending stop portion 26, as shown in Fig. 2, and the nibbling tool is adapted to be moved into a die 27 which is fitted into a die block 28. This die block is adapted to be secured to the bed of a drill press or other machine by means of the bolts 29. The stop portion 26 of the nibbling tool is of smaller diameter than the remainder of the nibbling tool so that a metal sheet may be fed into the tool to engagement with the portion 26, at which time, the cutting edge 25 may move downwardly and nibble out an arcuate piece of the metal.

A metal sheet 30 is shown in Fig. 4 and a line 31 is laid out on the metal sheet which is desired to be cut into the sheet. This sheet is taken in the hands by the operator and the point 32 is positioned against the stop pin 26 of the nibbling tool 10. As hereinbefore described, the arm 21 is positioned against a stationary part of the drill press or other machine with which the device is used and the spindle 2 is secured in a rotating chuck 1. This chuck 1 rotates the spindle 2 and track cam 4 within the stationary housing 8 and by the contour of the cam, the tool holder and nibbling tool is raised and lowered twice in each rotation of the track cam, it being noted that the tool holder is held stationary by the brackets 17.

This reciprocates the nibbling tool 10 into and out of the die 27 and upon each downward movement of the nibbling tool, a small arcuate piece is cut out of the metal sheet 30. By feeding the metal sheet 30 in the proper direction, the nibbling tool may be made to follow the line 31 laid out on the sheet so that a slot is cut in the sheet, as shown in Fig. 4, by the nibbling tool to produce the desired contour. By means of a file, the edge may then be smoothed to the desired contour. The bracket 22 is arranged to prevent and limit upward movement of the sheet and the slot 24 on the bracket 22 is sufficiently wide, as shown in Fig. 2, to allow plenty of clearance for the nibbling tool. This nibbling tool will operate satisfactorily on metal sheets up to one-eighth of an inch in thickness and a particular advantage of the tool is that it may be utilized with almost any type of rotating chuck.

From the foregoing description, it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a universal nibbler, a housing provided with an extending stop arm, a track cam member rotatably mounted in the housing and provided with a spindle extending from the housing, a tool holder reciprocably mounted in the housing and having a stud and a cross arm, the track cam member being provided with a recess for the stud concentric with its axis, a roller on each end of the cross arm riding in the track cam, means preventing rotation of the tool holder in relation to the housing, a bracket secured to the housing and having an extending slotted end and a nibbling tool secured in the tool holder and extending through the slotted end of said bracket.

2. In a universal nibbler, a housing, a stop arm secured to the housing, a track cam rotatably mounted in the housing and provided with a spindle extending therefrom, a tool holder having a cross arm and an extending stud, a roller on each end of the cross arm positioned in the track cam and the stud extending into a recess provided therefor in the track cam member, the tool holder being reciprocably mounted in the housing, a nibbling tool secured in the end of the tool holder and means preventing rotative movement of the tool holder in relation to the housing.

JOSEPH C. CHENETTE.